US009927226B2

(12) United States Patent
Kempe et al.

(10) Patent No.: US 9,927,226 B2
(45) Date of Patent: Mar. 27, 2018

(54) METHOD AND CONFIGURATION FOR DEPTH RESOLVED OPTICAL DETECTION OF AN ILLUMINATED SPECIMEN

(71) Applicant: Carl Zeiss Microscopy GmbH, Jena (DE)

(72) Inventors: Michael Kempe, Jena (DE); Ralf Wolleschensky, Jena (DE); Michael Schwertner, Jena (DE)

(73) Assignee: Carl Zeiss Microscopy GmbH, Jena (DE)

( * ) Notice: Subject to any disclaimer, the term of this patent is extended or adjusted under 35 U.S.C. 154(b) by 443 days.

(21) Appl. No.: 14/146,433

(22) Filed: Jan. 2, 2014

(65) Prior Publication Data
US 2014/0118750 A1 May 1, 2014

Related U.S. Application Data

(63) Continuation of application No. 13/170,807, filed on Jun. 28, 2011, now abandoned, and a continuation of (Continued)

(51) Int. Cl.
*G02B 21/00* (2006.01)
*G01B 11/24* (2006.01)
(Continued)

(52) U.S. Cl.
CPC ............... *G01B 11/24* (2013.01); *G01B 9/04* (2013.01); *G02B 21/0032* (2013.01);
(Continued)

(58) Field of Classification Search
CPC ... G01B 11/25–11/2513; G01S 17/102; G01N 21/956; G02B 27/0031;
(Continued)

(56) References Cited

U.S. PATENT DOCUMENTS

| 5,668,631 A * | 9/1997 | Norita ............... G06T 7/521 250/559.22 |
| 5,689,335 A * | 11/1997 | Strauss ............... G01V 8/12 356/484 |
| 2009/0244482 A1* | 10/2009 | Elsner ............... A61B 3/1025 351/206 |

OTHER PUBLICATIONS

Heintzmann R, Cremer C; "Laterally modulated excitation microscopy; improvement of resolution by using a diffraction grating"; in Proc. of SPIE 1998, 3568; pp. 185-196.*

(Continued)

*Primary Examiner* — Tri Ton
*Assistant Examiner* — Rebecca C Bryant
(74) *Attorney, Agent, or Firm* — Duane Morris LLP

(57) ABSTRACT

A method and a configuration for the depth-resolved optical detection of a specimen, in which a specimen or a part of the specimen is scanned by means of preferably linear illumination. The illumination of the specimen is periodically structured in the focus in at least one spatial direction. Light coming from the specimen is detected and images of the specimen are generated. At least one optical sectional image and/or one image with enhanced resolution is calculated through the specimen. Images are repeatedly acquired and sectional images are repeatedly blended while changing the orientation of the linear illumination relative to the specimen and/or spatial intervals between lines exposed to detection light from the illuminated specimen region are generated for the line-by-line non-descanned detection on an area detector or a camera and/or, during a scan, light is further deflected upstream of the detector through the line in the direction of the scan of the specimen.

3 Claims, 7 Drawing Sheets

Related U.S. Application Data application No. 12/323,095, filed on Nov. 25, 2008, now abandoned.

(51) Int. Cl.
*G01B 9/04* (2006.01)
*G02B 26/12* (2006.01)
*G02B 27/00* (2006.01)

(52) U.S. Cl.
CPC ........ *G02B 21/0036* (2013.01); *G02B 26/127* (2013.01); *G02B 27/0031* (2013.01)

(58) Field of Classification Search
CPC .. G02B 26/127; G02B 26/101; G02B 21/008; G02B 21/0036
USPC .......................................................... 356/432
See application file for complete search history.

(56) References Cited

OTHER PUBLICATIONS

Heintzmann, Rainer. "Structured illumination methods." Handbook of biological confocal microscopy. Springer US, 2006. 265-279.*

* cited by examiner

METHOD AND CONFIGURATION FOR DEPTH RESOLVED OPTICAL DETECTION OF AN ILLUMINATED SPECIMEN

CROSS REFERENCE

This application is a continuation of U.S. patent application Ser. No. 13/170,807, filed on Jun. 28, 2011, which is a continuation of U.S. patent application Ser. No. 12/323,095, filed on Nov. 25, 2008, which claims the benefit of U.S. Provisional Patent Application No. 60/990,016 filed on Nov. 26, 2007, the contents of which are hereby incorporated by reference.

FIELD OF THE INVENTION

The present invention relates generally to the field of microscopy, and more particularly to microscopy in which structured illumination is used for depth discrimination in the wide field and for enhancing resolution and contrast.

BACKGROUND OF THE INVENTION

In microscopy, structured illumination is used for depth discrimination in the wide field [1][1] and for enhancing the resolution and the contrast [2]. Generally, a grating or another periodic structure is projected into the specimen [3] or an interference pattern is generated in the specimen by means of interference of coherent component beams [4]. By shifting the illumination structure, images are generated that differ from one another with different phase angles of the period structure. Subsequently, these images are suitably blended with one another so as to obtain an optical sectional image and/or an image with enhanced contrast and enhanced resolution. The disadvantage is that the signal from out-of-focus regions of the specimen is detected as well, which, because of the limited dynamic region of the detector, leads to a reduced signal-to-noise ratio. The strength of the out-of-focus signal limits the useful sample thickness. This is of considerable significance, especially in cases in which the frequency of the structure approaches the diffraction-limited threshold frequency of the optical system, and the contrast of the structure is therefore necessarily low. This invariably applies to cases in which the objective is enhancement of contrast and resolution.

[1] Bracketed references refer to the list of references at the end of the specification prior to the claims.

One solution to this problem aims at a partially confocal detection which is made possible by structuring a line of light and detecting the thereby excited fluorescent light by means of a slit detector [5]. However, this method has a number of disadvantages. Structuring occurs only along the line. As a result, the effects of contrast and resolution enhancement are limited to this direction. Thus, especially in cases of nonlinear [6], but also linear, structures [7], the discrepancy between the one direction with enhanced resolution and all other spatial directions is significant. It is necessary to scan the line in a random direction in the specimen plane and to set the phase angle of the period structure. In the prior art, this requires separate actuators for controlling the relative phase angle and the scanning procedure.

SUMMARY OF THE INVENTION

It is accordingly an object of the present invention to overcome the drawbacks of the prior art.

According to the present invention, the advantages of structured illumination in the wide field (few optical components, high parallelization) are combined with the advantages of structured illumination along a line (partially confocal suppression of the background signal for maximum contrast, high intensities in the focus for nonlinear and linear specimen interactions). The proposed configuration makes it possible to rotate the scanning direction rapidly, variably, and precisely, and to adjust the relative phase angle of the imaged structured periodic structure by means of only two scanners. In addition, it enables a variably adjustable confocal detection while allowing only very low losses of light in the detection beam path. In this context, reference is also made to DE 10155002 A1, the disclosure of which is hereby incorporated by reference as if such disclosure were fully set forth herein.

A solution according to the present invention is preferably a line-scanning microscope with as few components in the detection beam path as in a wide-field system. This includes an objective lens which is corrected for an infinite beam path, a barrel lens, a main color divider, an emission filter and a camera. In the excitation beam path, a beam-shaping unit which shapes the light beam of a light source. The light beam has been intensity-modulated by a modulator into a line that is modulated along the line width. In an example illustrated in FIG. 1, the beam-shaping unit includes a combination of a line-shaping optics system and a periodic structure, wherein the line-shaping optics system and the periodic structure are combined to form a single mechanical group that can be rotated about the optical axis. By rotating the beam-shaping unit, which is preferably implemented by a rapid stepping motor, it is possible to set the orientation of the line imaged in the specimen x/y plane.

According to another embodiment of the present invention (not shown in FIG. 1), the beam-shaping unit can also be implemented by means of a single diffractive optical element which can also be rotated about the optical axis. A diffractive element of this type can shape the line in one direction and structure the line in a direction orthogonal thereto in a single step.

Disposed further along the optical axis are a first scanner, a second scanner orthogonal to the first scanner, and a scanning lens. The axis of rotation or swivel axis of the scanner is disposed substantially orthogonal to the axis of rotation of the first scanner. The scanner is used to shift the line in the specimen in the x-direction, and the scanner is used to shift the line in the y-direction.

Both scanners and are disposed near the conjugate pupil plane.

DESCRIPTION OF THE EMBODIMENTS OF THE INVENTION

Figure 1:
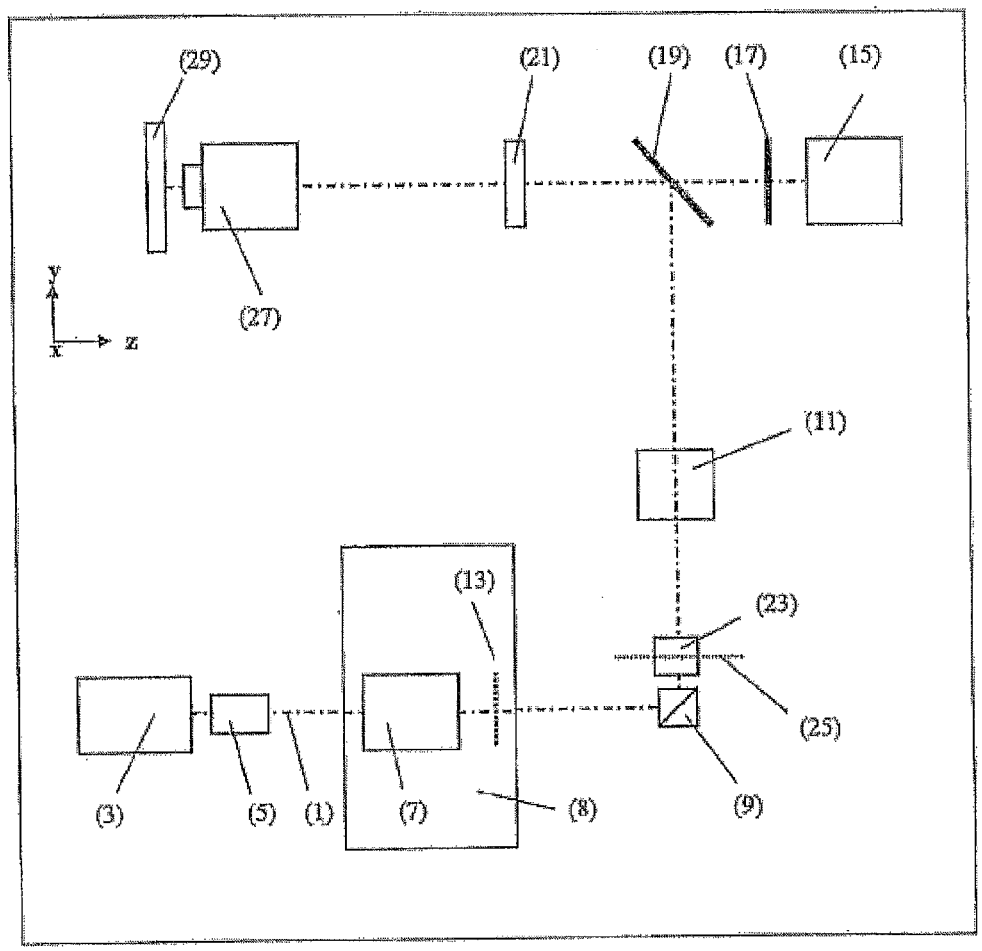
FIG. 1 is a schematic assembly of the microscope according to the present invention.

FIG. 1 shows the schematic assembly of the microscope according to the present invention. (1) is the optical axis, (3) is the light source, (5) is a switchable attenuator/AOM, (8) is a beam-shaping unit with a line-shaping optics system (7), for example, a cylindrical lens, (9) is scanner with an axis of rotation perpendicular to the drawing plane, (23) is a scanner with an axis of rotation (25) substantially parallel to the drawing plane, (11) is a scanning optics system, (13) is a mask with a periodic structure in the intermediate image plane conjugate to the specimen, (15) is a spatially resolved area sensor, e.g., a CCD receiver matrix, (17) is an emission filter, (19) is a main color divider, (21) is a barrel lens, (27) is a microscope lens, and (29) is the specimen. The elements (7) and (13) are combined to form a single mechanical group, the beam-shaping unit (8), which is preferably disposed so as to be able to rotate about the optical axis (1).

Next, shifting the phase of the structured line and scanning the image field by means of the interaction of the two scanners (9) and (23) with the AOM (5) will be described.

Without loss of generality, an example will be described, wherein the line in the specimen is oriented along the x-direction and scanning of the image field takes place in the y-direction, perpendicular to the x-direction. This also requires an orientation of the beam-shaping unit (8) to generate an orientation of the line in the x-direction.

During this line orientation, the scanner (23) serves to change the phase angle of the structure between two and more acquired images, while the scanner (9) is responsible for the scanning procedure in the y-direction.

From the images acquired at different phase angles ("phase images"), a sectional image is calculated (reconstructed). In this context, reference is made to DE 10155002 A1.

Figure 2:
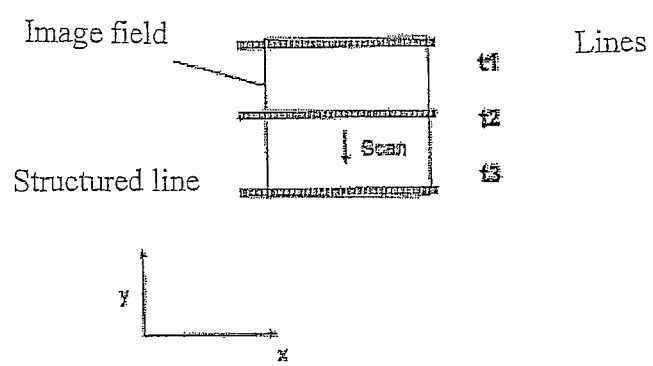
FIG. 2 shows the structure of the illumination.

FIG. 2 shows the structure of the illumination.

If, during a linear scan by the scanner (9) over a time $\Delta t = t3 - t1$, the camera synchronously acquires an image with an exposure time of at least $\Delta t$, the result obtained is equivalent to a wide-field image of the specimen. At the same time, the out-of-focus background is detected as well. According to the present invention, confocal filtering can be used if the modulator (5), synchronously with the scanning procedure, periodically switches the illumination on and off in the y-direction as each phase image that is needed to calculate a sectional image is acquired.

One advantage is that even during the switched-off intervals, the scanner, in addition to the continuous scanning motion with on and off switching, can be rapidly moved to the next position with switched-on illumination in which the illuminated scanning procedure is continued. The scanner could also move step-by-step, similar to a stepping motor.

Figure 3:
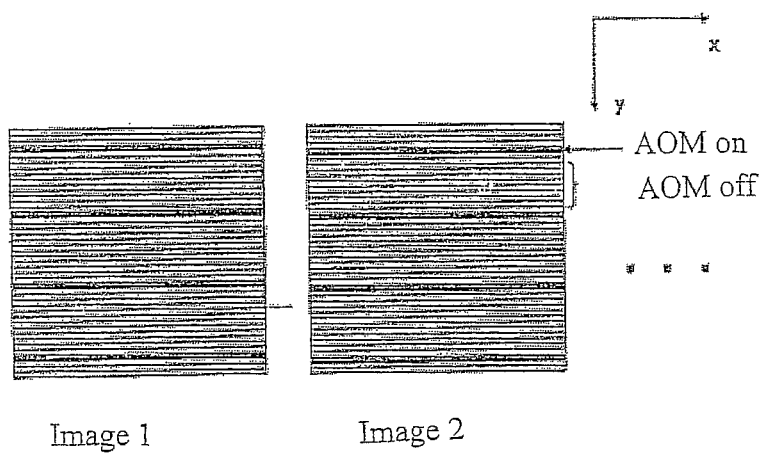
FIG. 3 illustrates exposure patterns.

The method according to the present invention leads to an exposure in the camera plane, which exposure is structured in the y-direction (see FIG. 3). In one embodiment of the invention, the spatial intervals between the exposed lines of the camera are selected in such a manner that cross-talk of the out-of-focus background is minimized during the illumination of a line on the specimen into the region of the camera that corresponds to the illumination of the next line in the specimen. When the specimen is scanned according to the Nyquist theorem (one detector line corresponds to half the width of the diffraction-limited line), empirically a spatial interval of M=5 to 10 lines between neighboring exposure lines should be sufficient. In the next image acquired by the camera, the exposed line pattern is preferably is shifted by one line, which is implemented by an appropriate delay in switching the modulator on. Thus, for example, first the 1st, 10th, 20th line and subsequently, the 2nd, 11th and 21st line are exposed.

This procedure of shifting the specimen illumination line by line is repeated until all sections of the specimen in the image field have been scanned, so that M images per phase angle are obtained as a result of this acquisition procedure.

As an alternative, to set the spatial interval between exposed lines, first, images could be acquired at several phase angles of the periodic structure, and subsequently the spatial interval could be changed for the acquisition of several more phase images.

In addition to the method already described above, each of these images can be created by repeatedly acquiring each image, preferably at the lowest possible intensity to spare the specimen, using the same scanner settings and then taking the mean. This method can reduce artifacts due to bleaching phenomena taking place in the specimen. By blending M images per phase angle, it is now possible to adjust the confocality.

Specifically, it is necessary to subtract the exposed background between the exposed receiver lines, which was detected by the receiver, for the individual images. This background can be readily identified on the receiver since the exposed lines in the specimen can be unambiguously linked to regions that are separated from one another on the camera.

If all M images of a phase angle are simply summed up, a result corresponding to the wide-field image is obtained. Summing up the images after selection of the lines that correspond to the relevant illuminated lines in the focus of the specimen leads to a confocal image. In this step, the image regions neighboring the selected lines are, as described, masked and not analyzed. This corresponds to the function of a virtual slit diaphragm, since the unused, masked image regions correspond to the detection sites of the out-of-focus scattered light. The confocality can be varied between 1 Airy unit (2 lines selected) and M Airy units (virtual slit diaphragm).

FIG. 3 shows the exposure pattern on the camera for confocal detection with the modulator on and off (AOM).

Compared to nonconfocal detection, the speed of image acquisition is decreased by the factor M. Based on an image acquisition of 50 images/s, at M=5, a complete image can be obtained in 100 ms (at a phase angle of the structure). However, it should be noted that for each structure orientation, N=3 to 5 images at different phase angles must be acquired. Thus, in the case of a linear structure with 3 structure orientations, typically, 9 images must be taken [7], which, at M=5, leads to an image acquisition time of approximately 1 s per plane.

A slightly more favorable situation results if the scanner (9) does not scan the image field uniformly (at speed $v_s$) but moves at a maximum speed $v_{max}$ during the times in which the laser is switched off. Although this makes higher demands on the control and synchronicity of the scanners, it increases the image acquisition time by the factor $$sf = \frac{M}{(M-1)\frac{v_s}{v_{max}} + 1}$$

i.e., approximately M-fold (if $v_{max} \gg v_s$) or up to the maximum image acquisition speed of the camera.

When linear structured illumination is used, it should be remembered that the length of the higher orders transmitted through the circular pupil is shortened as the structuring frequency increases (see FIG. 4), This means that the contrast of an interference with the 0th order decreases on the illumination side. However, if the passage through the pupil is symmetrical, the contrast of the interference between the higher orders remains unchanged at 100%. In addition, the width of the diffraction-limited line in the image increases. At a structuring frequency f that has been standardized to the threshold frequency, a widening b (line width divided by the minimum width at full numerical aperture NA) of $$b = (2\sqrt{1-f^2})^{-1}$$

results. For a typical structuring frequency of 90% of the threshold frequency (f=0.9), a widening of 15% results. At 95% of the threshold frequency, this widening increases to 60%. This widening does not have an influence on the resolution that is determined by the structuring frequency and the transfer function of the objective lens, but it does influence the suppression of the out-of-focus background and must be taken into consideration for confocal filtering.

Figure 4:
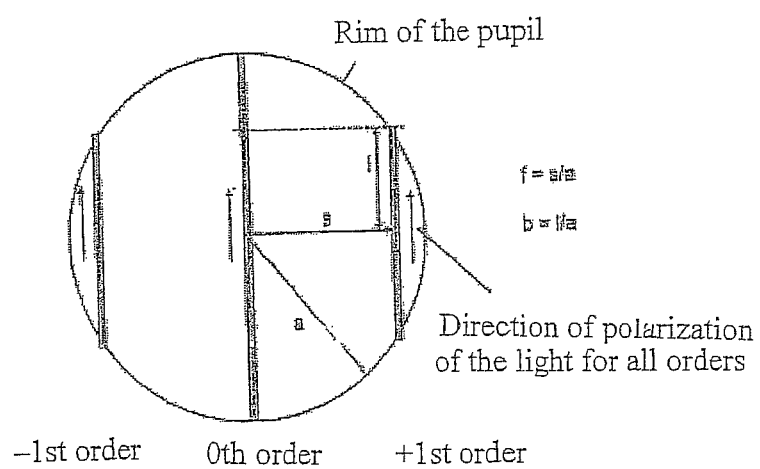
FIG. 4 shows orders of the structured line illumination in the pupil.

FIG. 4 shows orders of the structured line illumination in the pupil (Fourier transformation of a structured line distribution).

A structured line is generated on the specimen by the interfering first diffraction orders. The spatial interval of the diffraction orders is s; a denotes the size of the pupil. The ratio between s and b is the structuring frequency f that has been standardized to the threshold frequency.

The lines parallel to the x-direction seen in FIG. 3 represent only one structure orientation. The orientation of the lines on the camera can be set by rotating the unit (8) (FIG. 1). The direction of shift and the phase angle of the periodic structure are set by means of the scanners (9) and (23).

Figure 5:
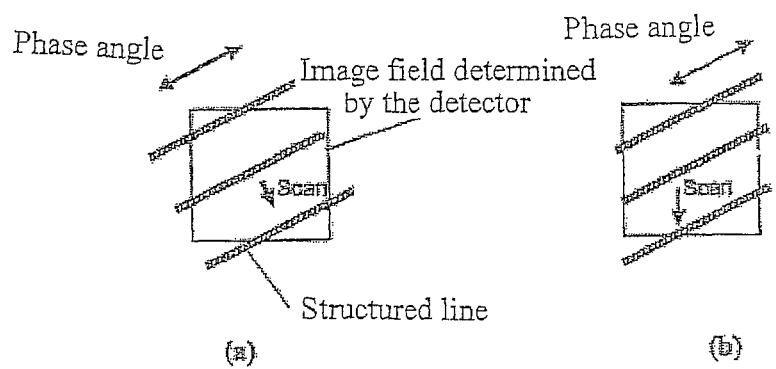
FIG. 5 illustrates the general case with a random line orientation.

FIG. 5 illustrates the general case with a random line orientation.

FIG. 5 explains how to set the scanning direction and the phase angle by means of the scanners with synchronous scanner movement (a) and scanning with a scanner (b).

The phase angle (double arrow) of the projected structure is determined by the relative constant offset of the two scanners (9) and (23) during the scan, while the direction of scan preferably perpendicular thereto (arrow) is defined by the relative speed of the two scanners. However, the specimen can also be scanned with scanner (9) only. This simplifies system control. Depending on the scan mode, it must be ensured that the image field generally determined by the detector is illuminated as homogeneously as possible even when the line is rotated.

In the configuration described so far, shaping of the structure projected into the specimen is ensured by the beam-shaping unit (8). According to the invention, the unit (8) can be a combination of a line-shaping optics system (7) with a periodic structure (13). The line-shaping optics system can comprise a Powell lens. The period structure can be a phase structure, an amplitude structure or a combination of the two. In addition, the entire beam-shaping unit (8) can be replaced with a diffractive optical element (see also DE 10155002 A1). This element can generate one or more structured lines on the specimen at a minimum spatial interval M in order to reduce the number of shifts.

A potential problem of sequential scanning of the sample with M line patterns arises when the specimen moves during the time of image acquisition. This is a fundamental problem of the method for the structured illumination and should be minimized as much as possible by minimal image acquisition times. This is why the sensitive detection with minimum fluorescence losses between the specimen and the detector is so important. An alternative to sequential scanning with M line patterns that makes it possible to acquire a single image instead of M line images and yet allows confocal detection will be described below. To this end, one takes advantage of the fact that the line scanner scans the specimen sequentially line-by-line. This makes it possible to implement a discrete line-by-line deflection of the detection light by an additional element in the detection beam path so that a line pattern as shown in FIG. 3 forms on the detector even though the specimen is scanned without spatial intervals. The prerequisite for depicting a complete image on the detector in this manner is that this detector has M more lines than are required for the image. A typical value is 500 lines per image. At M=5, this leads to a required detector line number of 2500. The element to be used to implement the line deflection could be, e.g., a galvanometer scanner upstream of the detector (see FIG. 6, scanner (24)). If the pixel size on the camera is 5 μm, the maximum angle of deflection is such that in the example mentioned above, an offset of (2500-500)×5 μm=10 mm results on the camera. Assuming a spatial interval of 50 mm between the camera and the scanner, this corresponds to a scan angle of 5 degrees (for a deflection of 10 degrees). To ensure that the line scanned in the specimen is not blurred across the spatial intervals between the lines, it is useful to switch off the exposure (e.g., by means of the AOM or AOTF) during the discrete deflection by scanner (24). However, a continuous exposure is conceivable as well. Since the scanning speed of the scanner (24) must be very high compared to that of scanner (9), the exposure can be disregarded during the movement of the scanner (24). For example, the scanner (24) with the same axis of deflection as the scanner (9), which as described above is responsible for the deflection in the y-direction, generates, for example, 10 offset discrete scan jumps within one line position of the sequential line scan of the scanner (9) before it advances to the next detected line position. The scanner (9) can also scan continuously, while scanner (24) must always be operated discretely, with a high deflection speed. The time $t_j$ between the scan jumps with a time $t_d$ corresponds to the effective line integration time on the camera. At least $M \cdot t_d < t_j$ must apply.

On the area detector, these scan jumps generate spaced-apart signals of the illuminated specimen which approximately correspond to the spaced-apart regions of the detector as described in detail above especially in connection with FIG. 3.

Figure 6:
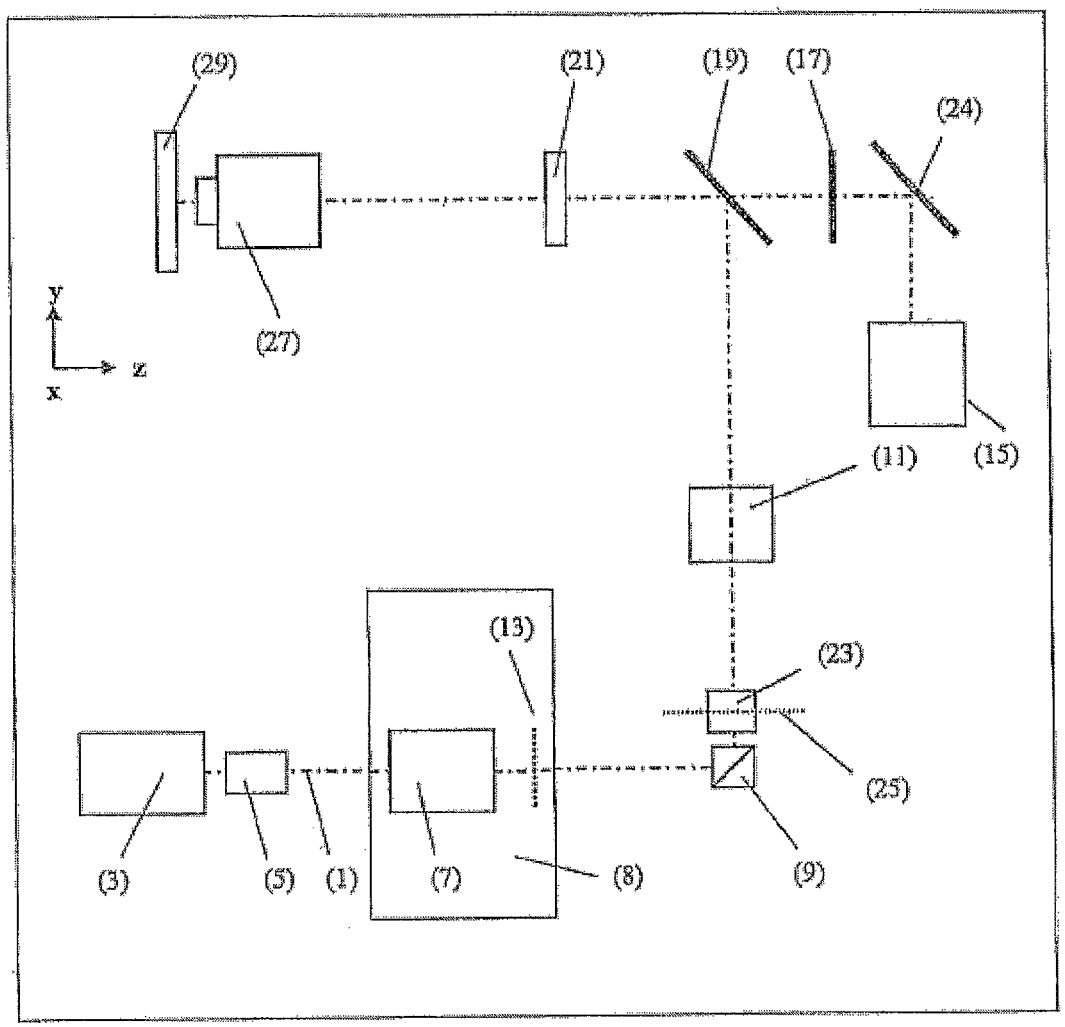
FIG. 6 is a schematic assembly of the microscope with alternative detection and an additional galvanometer scanner with an axis of rotation perpendicular to the drawing plane.

FIG. 6 shows the schematic assembly of the microscope with alternative detection and an additional galvanometer scanner (24) with an axis of rotation perpendicular to the drawing plane When using optics systems with higher numerical apertures, such as are normally used in microscopy, polarization must be taken into consideration if a structured illumination with the highest possible contrast of the structure in the specimen plane is to be obtained. Maximum contrast is possible only if the polarization of the illuminating light is perpendicular to the connecting line of the diffraction orders in the pupil plane (i.e., perpendicular to the position of the line in an image plane), as shown in FIG. 4. The polarization of the illuminating light must therefore be rotated with the rotation of the beam-shaping unit (8) synchronously with the rotation of the diaphragm. This can preferably be generated by rotating a λ/2 plate in the beam path of the linearly polarized excitation light, with the angle of rotation of the wave plate being half as large as that of the beam-shaping unit. Accordingly, a rotatable wave plate should be disposed in the beam path of FIGS. 1 and 6 between the source (3) and the main color divider (19). As an alternative, the beam-shaping unit can also be fitted with a polarizer that transmits only correctly oriented, linearly polarized light. This entails a rotation-dependent loss of light, see FIG. 7, which can be compensated for by suitably synchronized light modulation.

Figure 7:
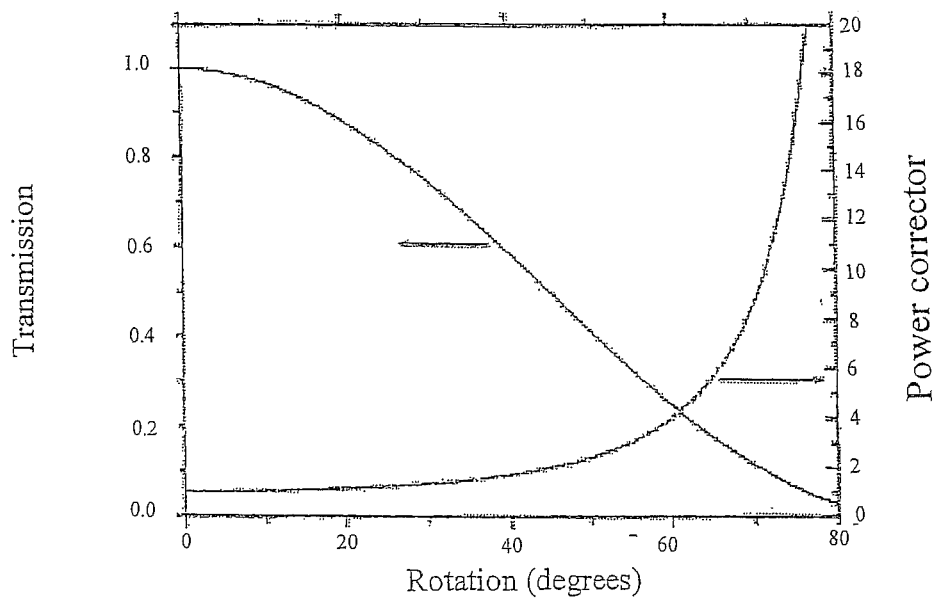
FIG. 7 illustrates the loss of light as a result of the rotation of a polarizer in combination with the beam-shaping unit and compensation of the loss by adjusting the power.

FIG. 7 shows the loss of light as a result of the rotation of a polarizer in combination with the beam-shaping unit (8) and compensation of the loss by adjusting the power.

The invention is not limited to the embodiments described above.

Within the context of the actions and knowledge of those skilled in the art, modifications and changes can be covered by the inventive thoughts, For example, the present invention can be applied analogously to other illumination distributions, such as multi-point configurations (U.S. Pat. No. 6,028,306) and other point configurations, including Nipkow disks, and to detection in wide field.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

REFERENCES

[1] Neil M. A. A., Juskaitis R., Wilson T.: "Method of obtaining optical sectioning by using structured light in a conventional microscope", Opt. Lett. 22 (24): 1905-1907, 1997

[2] Lukosz W., Marchand M., "Optische Auflösung unter Überschreitung der beugungsbedingten Auflösungsgrenze", Optica Acta 16, 241-255, 1963

[3] Heintzmann R., Cremer C., "Laterally modulated excitation microscopy; improvement of resolution by using a diffraction grating", in Proc. of SPIE 3568; 185-196, 1998

[4] Nell M. A. A., Juskaltis, A., Wilson, T., "Teal time 3D fluorescence microscopy by two beam interference illumination", Opt. Comm. 153: 1-4, 1998

[5] U.S. Pat. No. 6,947,127 B2, 2005

[6] Heintzmann R., Jovin T. M., Cremer C., "Saturated patterned excitation microscopy—a Concept for optical resolution improvement" JOSA A, 19 (8): 1599-1609, 2002

[7] Gustafsson, M. G. L., Agard D. A., Sedat, J. W., "Doubling the lateral resolution of wide-field fluorescence microscopy by structured Illumination", in Proc. of SPIE 3919 141-150, 2000

[8] Gustafsson M. G. L., "Nonlinear structured-illumination microscopy; wide-field fluorescence imaging with theoretically unlimited resolution", PNAS 102: 13081-13086, 2005

The invention claimed is:

1. A method for depth-resolved optical detection of a specimen, comprising
    scanning sequentially line-by-line a plurality of lines of said specimen or a part of said specimen by means of linear illumination,
    shifting said linear illumination in an x-direction by a first scanner and shifting a line of said plurality of lines in an y-direction by a second scanner, said first and second scanners having swivel axes orthogonal to one another for said shifting, said x-direction being orthogonal to said y-direction, thereby causing relative movement between said specimen and said linear illumination,
    said linear illumination being periodically structured illumination in at least one spatial direction, said linear illumination being a structured line having an orientation in an x-direction,
    detecting by a detector detection light coming from the specimen as a result of said illumination, thereby generating images of the specimen,
    calculating at least one optical sectional image and/or one image with enhanced resolution of the specimen,
    wherein during said scanning, detection light is deflected upstream of said detector between said detector and said specimen along an illuminated line in the y-direction by means of a discretely operated scanner, said discretely operated scanner having a speed of operation, to implement line deflection, and wherein the speed of the discretely operated scanner causing the light deflection is greater than the speed of relative movement between the specimen and the illuminating light in said y-direction, thus causing a discrete line-by-line deflection of detection light in said y-direction so that a line pattern forms on the detector having spatial intervals between exposure lines even though the specimen is scanned without spatial intervals.

2. The method of claim 1, wherein the light is deflected step-by-step.

3. The method of claim 1, wherein the light is deflected continuously.

* * * * *